United States Patent
Wilder et al.

(10) Patent No.: US 6,167,627 B1
(45) Date of Patent: Jan. 2, 2001

(54) AERONAUTICAL HOLDING PATTERN CALCULATOR

(76) Inventors: Bruce Gary Wilder, P.O. Box 10028, Manassas, VA (US) 20108; Otto Charles Wilke, 3417 Castle, Waco, TX (US) 76710

( * ) Notice: Under 35 U.S.C. 154(b), the term of this patent shall be extended for 0 days.

(21) Appl. No.: 09/076,689

(22) Filed: May 12, 1998

(51) Int. Cl.[7] .................................................. G01C 21/20
(52) U.S. Cl. ...................................... 33/15 D; 235/61 NV
(58) Field of Search .................................. 33/15 D, 1 CC, 33/15 B, 430, 431; 235/61 NV, 70 R, 70 A, 79.5

(56) References Cited

U.S. PATENT DOCUMENTS

| | | |
|---|---|---|
| D. 377,942 | 2/1997 | McCloy . |
| 2,007,986 | 7/1935 | Sprague . |
| 2,026,537 * | 1/1936 | Jensen .................................. 33/1 SD |
| 2,105,103 * | 1/1938 | Sinitzin-White .................... 33/1 SD |
| 2,408,776 * | 10/1946 | Hilsenrath et al. .................. 33/1 SD |
| 2,588,433 * | 3/1952 | Twamley ............................. 33/1 CC |
| 2,736,096 | 2/1956 | Greene . |
| 2,775,404 * | 12/1956 | Lahr ...................................... 1/1 SD |
| 3,609,299 | 9/1971 | Wright . |
| 3,654,436 | 4/1972 | Sansom, Jr. . |
| 3,835,299 | 9/1974 | Turney . |
| 3,855,706 | 12/1974 | Price . |
| 3,957,199 * | 5/1976 | Hunter .............................. 235/61 NV |
| 4,096,635 * | 6/1978 | McMillan .............................. 33/457 |
| 4,134,006 | 1/1979 | Gordon . |
| 4,359,628 * | 11/1982 | Lambert ........................... 235/61 NV |
| 4,499,665 | 2/1985 | Davis . |
| 4,652,728 | 3/1987 | Galiana . |
| 4,996,776 * | 3/1991 | Poirier .................................. 33/1 SD |
| 5,214,855 | 6/1993 | Gibbs . |
| 5,553,387 | 9/1996 | Newcomb . |

FOREIGN PATENT DOCUMENTS

| | | |
|---|---|---|
| 135602 | 12/1949 | (AU) . |
| 1090442 | 3/1955 | (FR) . |
| 601 756 | 2/1960 | (IT) . |
| 113 277 | 2/1945 | (SE) . |

\* cited by examiner

*Primary Examiner*—Diego Gutierrez
*Assistant Examiner*—Maria Fernandez
(74) *Attorney, Agent, or Firm*—Stephen Christopher Swift; Swift Law Office (57) ABSTRACT

A device for computing the heading of an airplane in the outbound leg of a holding pattern, and the bearing to a VOR or NDB station at which the airplane should begin turning inbound at the end of the outbound leg, given the bearing of the outbound leg, the speed and bearing of the wind, and the true airspeed of the plane, but without requiring the user to keep track of the time. In a first preferred embodiment, the invention comprises a slide rule with upper, middle and lower disks attached at their centers by a pivot, and a straight rule movably retained in a groove in an upper disk. There is a logarithmic scale for true airspeed on the straight rule, and a parallel and adjacent logarithmic scale for wind speed on the upper disk. The lower and middle disks each have degree markings, and the middle disk also has figures for heading and bearing corrections, to which arrows on the straight rule point.

In a second preferred embodiment, the invention comprises a digital electronic device programmed to make equivalent computations. The user is prompted to enter the given values. Heading and bearing corrections are retrieved from tables stored in memory, and used to compute the proper heading during the outbound leg and the bearing to the station at which to turn.

19 Claims, 8 Drawing Sheets

HEADING CORRECTIONS

RATIO OF WIND SPEED TO AIR SPEED

| GB - WB | 0.00 | 0.05 | 0.10 | 0.15 | 0.20 | 0.25 |
|---|---|---|---|---|---|---|
| 0 | 0 | 0 | 0 | 0 | 0 | 0 |
| 10 | 0 | -1 | -2 | -3 | -3 | -4 |
| 20 | 0 | -2 | -4 | -6 | -7 | -9 |
| 30 | 0 | -3 | -6 | -9 | -10 | -14 |
| 40 | 0 | -4 | -8 | -11 | -14 | -18 |
| 50 | 0 | -5 | -11 | -14 | -18 | -22 |
| 60 | 0 | -6 | -12 | -17 | -22 | -26 |
| 70 | 0 | -8 | -14 | -17 | -25 | -31 |
| 80 | 0 | -9 | -15 | -22 | -28 | -35 |
| 90 | 0 | -9 | -16 | -24 | -31 | -38 |
| 100 | 0 | -9 | -16 | -25 | -34 | -42 |
| 110 | 0 | -9 | -16 | -26 | -35 | -44 |
| 120 | 0 | -8 | -16 | -26 | -35 | -46 |
| 130 | 0 | -7 | -14 | -26 | -34 | -46 |
| 140 | 0 | -6 | -12 | -24 | -32 | -45 |
| 150 | 0 | -4 | -9 | -20 | -28 | -41 |
| 160 | 0 | -2 | -6 | -12 | -23 | -34 |
| 170 | 0 | -1 | -3 | -6 | -16 | -24 |
| 180 | 0 | 0 | 0 | 0 | 0 | 0 |
| 190 | 0 | 2 | 4 | 7 | 15 | 24 |
| 200 | 0 | 4 | 8 | 15 | 26 | 36 |
| 210 | 0 | 5 | 12 | 20 | 30 | 44 |
| 220 | 0 | 7 | 14 | 24 | 34 | 46 |
| 230 | 0 | 8 | 17 | 26 | 35 | 46 |
| 240 | 0 | 9 | 19 | 27 | 36 | 45 |
| 250 | 0 | 9 | 19 | 28 | 35 | 44 |
| 260 | 0 | 9 | 18 | 28 | 34 | 42 |
| 270 | 0 | 9 | 18 | 26 | 32 | 40 |
| 280 | 0 | 9 | 17 | 24 | 31 | 37 |
| 290 | 0 | 9 | 16 | 22 | 28 | 33 |
| 300 | 0 | 8 | 14 | 20 | 24 | 29 |
| 310 | 0 | 7 | 12 | 17 | 21 | 24 |
| 320 | 0 | 6 | 10 | 14 | 17 | 19 |
| 330 | 0 | 5 | 8 | 11 | 12 | 14 |
| 340 | 0 | 4 | 6 | 8 | 8 | 10 |
| 350 | 0 | 2 | 4 | 5 | 5 | 5 |
| 360 | 0 | 0 | 0 | 0 | 0 | 0 |

FIG. 6

STATION CORRECTIONS

| Left Turn GB-WB | Right Turn GB - WB | RATIO OF WIND SPEED TO AIR SPEED | | | | | |
|---|---|---|---|---|---|---|---|
| | | 0.00 | 0.05 | 0.10 | 0.15 | 0.20 | 0.25 |
| 360 | 0 | 32 | 30 | 28 | 26 | 24 | 23 |
| 350 | 10 | 32 | 30 | 29 | 27 | 26 | 24 |
| 340 | 20 | 32 | 31 | 30 | 28 | 27 | 26 |
| 330 | 30 | 32 | 31 | 31 | 30 | 28 | 28 |
| 320 | 40 | 32 | 32 | 32 | 31 | 31 | 31 |
| 310 | 50 | 32 | 33 | 33 | 33 | 33 | 33 |
| 300 | 60 | 32 | 34 | 34 | 35 | 35 | 36 |
| 290 | 70 | 32 | 34 | 35 | 37 | 38 | 39 |
| 280 | 80 | 32 | 35 | 37 | 39 | 40 | 42 |
| 270 | 90 | 32 | 35 | 38 | 41 | 43 | 46 |
| 260 | 100 | 32 | 36 | 39 | 43 | 46 | 50 |
| 250 | 110 | 32 | 36 | 40 | 44 | 48 | 53 |
| 240 | 120 | 32 | 36 | 41 | 46 | 51 | 57 |
| 230 | 130 | 32 | 36 | 41 | 47 | 54 | 60 |
| 220 | 140 | 32 | 36 | 42 | 48 | 55 | 64 |
| 210 | 150 | 32 | 36 | 41 | 48 | 55 | 66 |
| 200 | 160 | 32 | 36 | 40 | 46 | 54 | 66 |
| 190 | 170 | 32 | 36 | 39 | 44 | 51 | 62 |
| 180 | 180 | 32 | 35 | 38 | 42 | 46 | 52 |
| 170 | 190 | 32 | 34 | 36 | 39 | 40 | 40 |
| 160 | 200 | 32 | 33 | 35 | 37 | 34 | 32 |
| 150 | 210 | 32 | 33 | 33 | 33 | 30 | 28 |
| 140 | 220 | 32 | 32 | 32 | 31 | 28 | 24 |
| 130 | 230 | 32 | 31 | 30 | 28 | 26 | 23 |
| 120 | 240 | 32 | 31 | 29 | 27 | 24 | 21 |
| 110 | 250 | 32 | 30 | 28 | 25 | 23 | 20 |
| 100 | 260 | 32 | 30 | 27 | 24 | 22 | 19 |
| 90 | 270 | 32 | 29 | 27 | 23 | 21 | 18 |
| 80 | 280 | 32 | 29 | 26 | 23 | 21 | 18 |
| 70 | 290 | 32 | 29 | 26 | 23 | 20 | 18 |
| 60 | 300 | 32 | 29 | 26 | 23 | 20 | 18 |
| 50 | 310 | 32 | 29 | 26 | 23 | 20 | 18 |
| 40 | 320 | 32 | 29 | 26 | 23 | 21 | 19 |
| 30 | 330 | 32 | 29 | 26 | 23 | 21 | 20 |
| 20 | 340 | 32 | 29 | 26 | 24 | 22 | 21 |
| 10 | 350 | 32 | 29 | 27 | 25 | 23 | 22 |
| 0 | 360 | 32 | 30 | 28 | 26 | 24 | 23 |

AERONAUTICAL HOLDING PATTERN CALCULATOR

BACKGROUND OF THE INVENTION

1. Field of the Invention

The present invention relates to a device for performing calculations relating to aeronautical holding patterns, having both mechanical and electronic embodiments, which we call the "No Time Holding Pattern Solver."

2. Description of the Prior Art

One of the most difficult problems for new aircraft pilots to learn while in training is how to properly execute a holding pattern. A holding pattern is a generally oval flight pattern designed to hold an aircraft at a known position for known delays. The aircraft normally reduces its airspeed when in the holding pattern to save fuel, but must continue flying fast enough for its wings to have sufficient lift to maintain controllability. It comprises an inbound leg, in which the airplane is flying in a straight line toward a reliable fix, an outbound leg, in which the airplane is flying in a straight line away from the reliable fix, and two generally semicircular turns between the legs. [A reliable fix is the point at which the aircraft passes a VOR (Very high frequency Omnidirectional Range) station or NBD (Nondirectional Radio Beacon) station, or a VOR intersection, NDB intersection, or VOR/NBD intersection, i.e., a point of intersection between lines representing bearings to a plurality of VOR and/or NBD stations.] Traditionally, pilots have had to time the outbound leg of a holding pattern, so as to know when to turn to yield a time of one minute on the inbound leg. The present invention simplifies this procedure, by letting a pilot know when to turn based on the plane's bearing to a station, without the use of a clock or other timing device. In particular, the invention makes use of the angle of the plane to a VOR or NBD station or other reliable fix.

U.S. Pat. No. 2,007,986, issued on Jul. 16, 1935, to Thomas L. Sprague, discloses a navigational instrument, having a plurality of pivotally connected disks, which enable a pilot to make adjustments for the wind and the deviation of magnetic north from true north. The instant invention is distinguishable, in that it enables a pilot to make adjustments for the bearing of a VOR or NDB.

U.S. Pat. No. 2,736,096, issued on Feb. 28, 1956, to Clarence K. Greene, discloses a radio plotter, having pivotally connected members, that a pilot may use in plotting a flight course using omnidirectional radio charts. The instant invention is distinguishable, in that it gives the VOR or NDB bearing at which a pilot should turn inbound at the end of an outbound leg of a holding pattern.

U.S. Pat. No. 3,609,299, issued on Sep. 28, 1971, to Jerauld G. Wright, discloses an aerial navigation computer, having pivotally connected disks and cursors, that can be used to perform calculations involving wind speed and direction, pressure, altitude, temperature, time and distance. The instant invention is distinguishable, in that it includes inputs and outputs of VOR or NDB bearings.

U.S. Pat. No. 3,654,436, issued on Apr. 4, 1972, to Richard A. Sansom, Jr., discloses an air navigation computer for windage problems. The instant invention is distinguishable, in that it calculates a VOR or NDB bearing.

U.S. Pat. No. 3,835,299, issued on Sep. 10, 1974, to Peter Baldwin Turney, discloses a navigational computer for solving windage problems, including a plurality of rotatable disks. The instant invention is distinguishable, in that it gives the VOR or NDB bearing for the end of an outbound leg of a holding pattern.

U.S. Pat. No. 3,855,706, issued on Dec. 24, 1974, to Richard J. Price, discloses a radio navigation plotter, including three pivotally connected discs and a slide rule. The instant invention is distinguishable, in that only it gives the VOR or NDB bearing at which to turn in a holding pattern.

U.S. Pat. No. 4,134,006, issued on Jan. 9, 1979, to Willard F. Gordon, discloses a navigational wind effect computer for aircraft, including three rotatable discs, for calculating wind and ground speed corrections. The instant invention is distinguishable, in that it calculates VOR or NDB bearings.

U.S. Pat. No. 4,499,665, issued on Feb. 19, 1985, to Randall C. Davis, discloses a course correction calculator, comprising a single sheet of transparent material, giving heading and speed corrections. The instant invention is distinguishable, in that it calculates VOR or NDB bearings.

U.S. Pat. No. 4,652,728, issued on Mar. 24, 1987, to Patrick Galiana, discloses a wind and course calculator for navigation, having two disks and a pointer that are rotatably connected, with a sliding element on the pointer. The instant invention is distinguishable, in that it performs calculations involving VOR or NDB bearings.

U.S. Pat. No. 5,214,855, issued on Jun. 1, 1993, to Charles W. Gibbs, discloses an instrument flight navigational apparatus and method, including a board, two disks and a pointer that are rotatably connected, and can be used to determine holding pattern entry procedures at VOR stations. The instant invention is distinguishable, in that only it allows the point at which a plane should turn at the end of the linear outbound portion of a holding pattern to be determined by a VOR or NDB bearing, without the pilot having to refer to a clock or other timing device.

U.S. Pat. No. 5,553,387, issued on Sep. 10, 1996, to John H. Newcomb, discloses an aircraft holding pattern wind compensator, being a circular slide rule with three disks that are pivotally connected at their centers. The device is used to calculate the length of time that a pilot should fly before turning inbound on the outward leg of a holding pattern. The instant invention is distinguishable, in that it gives the pilot the bearing of a VOR or NDB at which the pilot should turn, so that the pilot does not have to keep track of the time.

U.S. Pat. No. Des. 377,942, issued on Feb. 11, 1997, to John K. McCloy, discloses a design for a multilayer rotary holding pattern calculator, with no indication of VOR or NDB bearings. The instant invention is distinguishable, in that it includes the use of VOR or NDB bearings.

Swedish Patent No. 113 277, published on Feb. 20, 1945, issued to O. Dahlberg, discloses an instrument for making astronomical calculations, having two disks and a pointing arm connected at a common pivot. The instant invention is distinguishable, in that it may be used for calculating holding patterns independently of latitude and time of year.

Australian Patent No. 135,602, complete specification accepted on Jan. 15, 1948, issued to Philip John May, discloses improvements in navigational apparatus for use on aircraft. The instant invention is distinguishable, in that it enables calculations to be made involving VOR or NDB bearings.

French Patent No. 1.090.442, published on Mar. 30, 1955, issued to Marc-Maurice Sauzay and Albert-Pierre Sauzay, discloses a navigational instrument for use with navigational charts, having rotatably connected parts. The instant invention is distinguishable, in that it makes use of VOR or NDB bearings.

Italian Patent No. 601 756, issued on Feb. 8, 1960, to Bruno Rossi, discloses a circular protractor with a pivotally attached ruler, particularly adapted for aerial navigation. The instant invention is distinguishable, in that it makes use of VOR or NDB bearings.

None of the above inventions and patents, taken either singly or in combination, is seen to describe the instant invention as claimed.

SUMMARY OF THE INVENTION

The present invention is a device for computing the heading of an airplane in the outbound leg of a holding pattern, and the bearing to a VOR or NDB station at which the airplane should begin turning inbound at the end of the outbound leg, given the bearing of the outbound leg, the speed and bearing of the wind, and the true airspeed of the plane, but without requiring the user to keep track of the time. In the first embodiment, the invention comprises a slide rule with upper, middle and lower disks attached at their centers by a pivot, and a straight rule movably retained in a groove in an upper disk. There is a logarithmic scale for true airspeed on the straight rule, and a parallel and adjacent logarithmic scale for wind speed on the upper disk. The lower and middle disks each have degree markings, and the middle disk also has figures for heading and bearing corrections, to which arrows on the straight rule point. In a second preferred embodiment, the invention comprises a digital electronic device programmed to make equivalent computations. The user is prompted to enter the given values. Heading and bearing corrections are retrieved from tables stored in memory, and used to compute the proper heading during the outbound leg and the bearing to the station at which to turn. For both embodiments, the heading and bearing corrections are derived from dimensional analysis of simultaneous equations representing possible flight paths.

Accordingly, it is a principal object of the invention to simplify the process of flying an airplane in a holding pattern.

It is another object of the invention to provide a device that will improve air safety by enabling pilots to fly holding patterns more accurately and with less distraction.

It is a further object of the invention to prevent unnecessary fuel consumption from errors in flying holding patterns.

Still another object of the invention is to provide a device that will be useful in training new pilots to fly holding patterns.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a device for determining at what point a pilot should begin to turn an airplane inbound at the end of the outbound leg of a holding pattern, without requiring that the pilot keep track of the time. The turning point is given as a bearing to a station (which may be a VOR or NBD station). The invention also tells the pilot the heading in which to align the plane on the outbound leg, to compensate for the wind. The first preferred embodiment of the invention is a circular slide rule; the second preferred embodiment is a programmed electronic device.

VOR is a radio aid to navigation transmitting from a station on the ground in the frequencies between 108 and 118 megahertz. The signals are projected over 360 degrees in azimuth, creating a line of magnetic bearing extending from the station. The radials are orientated from magnetic north and follow an approximate line of sight course. This means that reception distance increases with an increase in the airplane's altitude. VOR stations are assigned three letter identifications which are broadcast continuously in Morse code; but some stations are also identified by a voice recording. VOR may be combined with DME (Distance Measuring Equipment) in the station and aircraft, to form VOR/DME. VOR may also be combined with TACAN (TACtical Air Navigation) to form VORTAC. TACAN is a system of navigation that uses ultrahigh frequency signals to determine the distance and bearing of an aircraft from a transmitting station.

NBD is a radio aid to navigation transmitting in the low and medium frequency bands. The frequency spectrum is from 190 kilohertz to 1,750 kilohertz. NBD stations transmit nondirectional signals enabling pilots of aircraft equipped with direction finding equipment to determine their bearing to or from the radio beacon, and thereby "home" or "track" to or from the station. NDB stations are assigned three letter identifications which are broadcast continuously in Morse code. When the radio beacon is installed in conjunction with the Instrument Landing System marker, it is normally called a Compass Locator. NDB may be combined with DME (Distance Measuring Equipment) in the station and aircraft, to form NDB/DME.

VOR and NBD stations (and VOR, NBD, and VOR/NBD intersections) shall hereinafter be referred to as "stations" in this application. Note that the principal differences between them are the frequency at which the signals are transmitted, and that only VOR is aligned magnetically.

Figure 1:
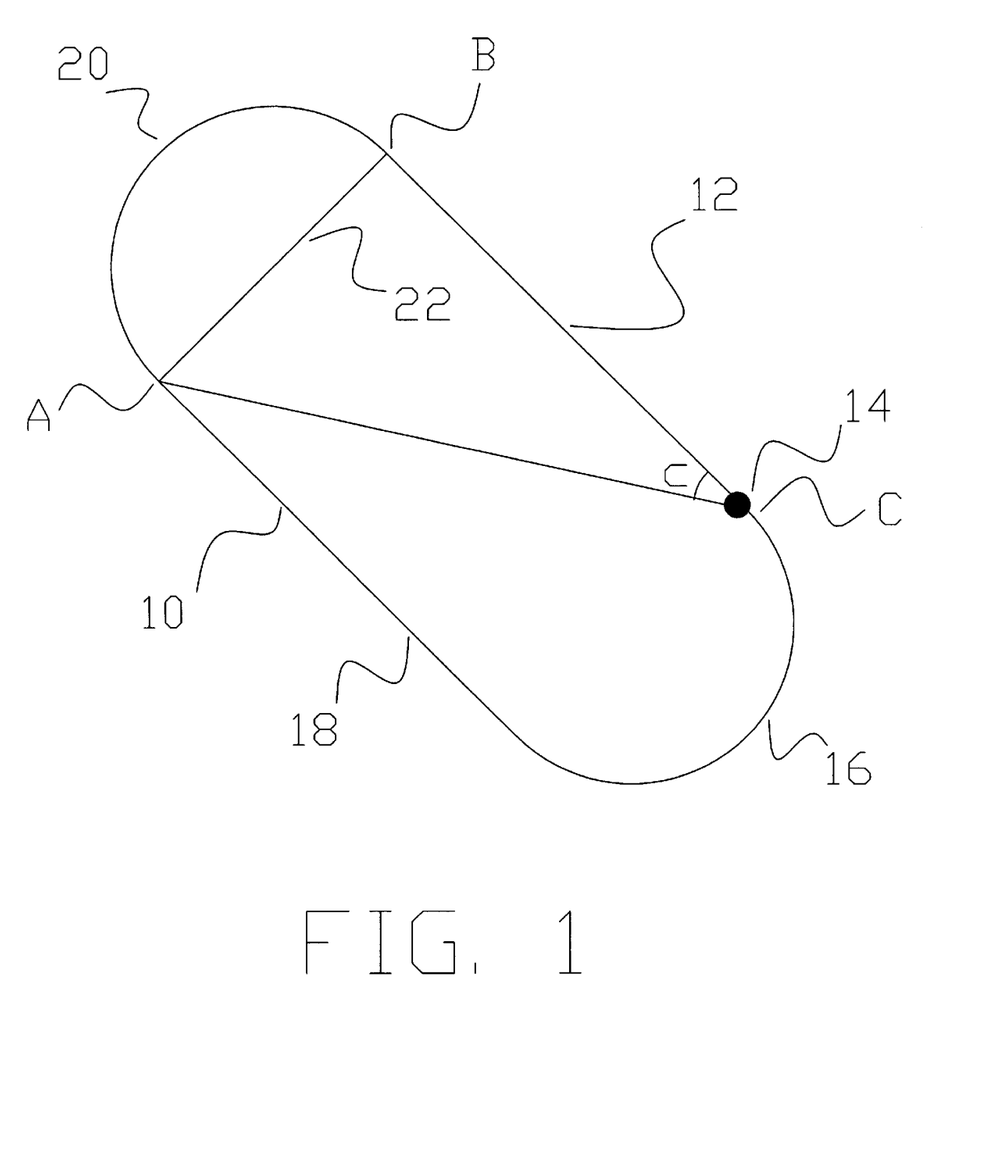
FIG. 1 is diagrammatic top view of an airplane holding pattern.

A holding pattern is illustrated in FIG. 1. The holding pattern 10 consists of a straight inbound leg 12, where the plane is flying toward the station 14, a semicircular turn 16 that begins when the plane reaches the station, a straight outbound leg 18(parallel to the inbound leg) where the plane is flying away from the station, and another semicircular turn 20 between the end of the outbound leg and the beginning of the inbound leg. The plane must remain in this pattern for as long as necessary, until the known delay has passed, and the pilot has received clearance to proceed further. The bearing (i.e., the direction from magnetic north) of the outbound leg, and the direction in which the airplane should turn, is transmitted to the pilot by an air traffic controller through radio voice communication. The bearing of the inbound leg is opposite (180 degrees from) that of the outbound leg. While executing the turns, the pilot is required to turn the airplane at the rate of three degrees per second, thus completing each 180-degree turn in sixty seconds. (If no direction is specified, the pilot should always turn to the right.) The plane is supposed to fly on the inbound leg for precisely sixty seconds. The timing of the outbound leg must be adjusted to meet the requirements for the inbound leg and the turns; if flying into a head wind, it may take longer than one minute; if flying with a tail wind, it may take less than one minute.

It may be seen from FIG. 1 that, assuming the airplane flies at a constant speed, time spent in legs and turns of the holding pattern is proportional to distance flown. (FIG. 1 assumes that there is no wind.) Let us call the distance flown in one minute, one unit. Thus, as turn 20 is a semicircle, line segment 22 from A to B would form the diameter of a complete circle of which it is part, having a circumference of 2 units. As the circumference of a circle is pi times the diameter, line segment 22 has a length of $2/\pi$ units. As inbound leg 12 has a length of one unit, the tangent of angle c of triangle ABC is $2/\pi$. Thus, angle c is the arctangent of $2/\pi$, or approximately 32.5 degrees. This shows that, when no correction for wind is necessary, the pilot should be turning the plane inbound when there is a 32.5-degree difference between the bearing for the inbound leg and the bearing of the station.

The first step in making the invention is to write a computer program to calculate the path of a turning airplane. The program must be run repeatedly to generate 360 degree turns for various speeds and bearings of the airplane and the wind. (Conceptually, a holding pattern may be formed by splitting each of these generally circular paths into two generally semicircular segments connected by two straight lines representing the inbound and outbound legs of the holding pattern.) From these data are determined the heading at which the pilot should align the airplane on the outbound leg, and the point at which the pilot should begin turning inbound at the end of the outbound leg with reference to the bearing or radial to a station. These results have been tested in actual airplane flights, with good agreement between the bearings determined by the computer and the bearings actually necessary in flight, provided that the speed of the wind in which the airplane is flying does not exceed approximately 25% of the speed of the airplane.

The computer program solves the following pair of simultaneous equations:

$$t[\cos(h)]+ws[\cos(wb)]=gs[\cos(gb)]$$

and $$t[\sin(h)]+ws[\sin(wb)]=gs[\sin(gb)]$$

where "t" (true airspeed) is the speed of the plane indicated by an instrument corrected for altitude, "h" (heading) is the bearing at which the airplane is aligned, "ws" (wind speed) is the speed of the wind, "wb" (wind bearing) is the bearing of the wind, "gs" (ground speed) is the actual speed of the airplane relative to the ground, "gb" (ground bearing) is the actual bearing at which the airplane is flying over the ground. [Note that the direction in which the plane is aligned (heading) may differ from the direction it is actually going (ground bearing), to compensate for the wind.]

The equations can be solved using standard mathematical software. The bearings are normally given in degrees from magnetic north. It may be necessary to convert the bearings from degrees to radians, by dividing by 180 and multiplying by the value of pi ($\pi$), if required by the software. The speeds may be given in any units (e.g., kilometers per hour, miles per hour, or knots) so long as the same units are used consistently.

Each of the above equations represents a triangulation in which four values are given and two are unknown. Solving for the two unknowns requires solving the set of two simultaneous equations. For the first solution for a given flight path, the values for wind speed, wind bearing, true airspeed, and ground bearing are given, and the unknowns are ground speed and heading. For each subsequent solution for the flight path, the value for the heading is changed to reflect a three-degree per second turn, the values for wind speed, wind bearing, and airspeed remain the same, and the unknowns are ground speed and ground bearing. The computer repeats the calculations until a full 360-degree turn is completed. (Wind conditions may cause the path to be elliptical or spiral, rather than a perfect circle.) Modular arithmetic is used to keep the bearings within the range from 0 to 360 degrees. Flight paths are calculated for ranges of values of wind speed, wind bearing, true airspeed and heading, and the results are tabulated and used to construct the invention, as described below.

Figure 2:
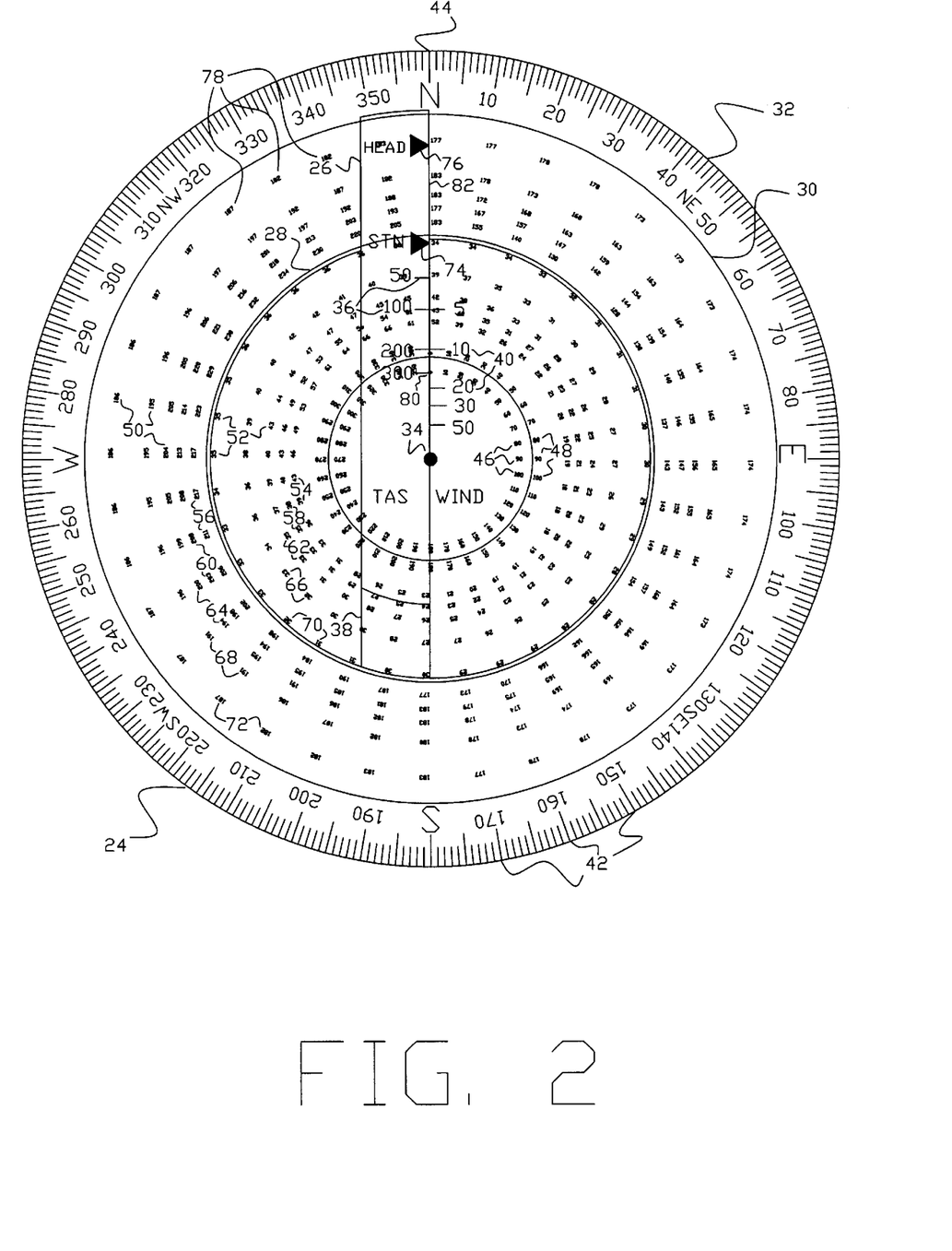
FIG. 2 is a top plan view of the first preferred embodiment invention.
Figure 3:
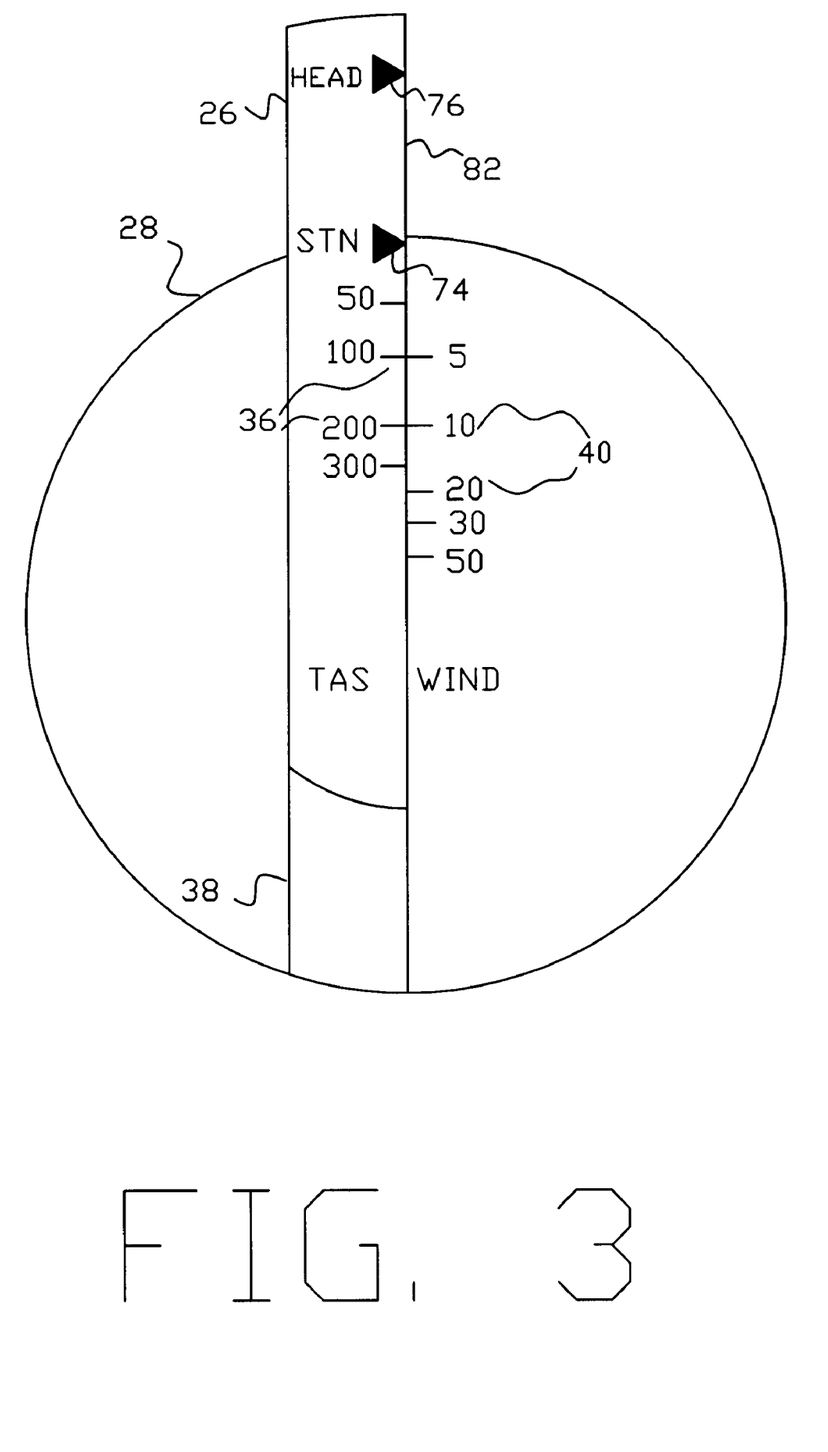
FIG. 3 is a top plan view of the upper disk and the straight rule of the first preferred embodiment of the invention.

The first preferred embodiment of the invention is an analog computation device, specifically a circular slide rule, that incorporates the results of these calculations, and is illustrated in FIG. 2. The slide rule 24 includes a straight rule 26 retained on an upper disk 28 (shown separately in FIG. 3), a middle disk 30 (shown separately in FIG. 4), and a lower disk 32 (shown separately in FIG. 5). The disks are connected by a pivot 34 passing through each of their centers. The upper and middle disks should be made of a transparent material, so that markings on the lower disk can be seen. The straight rule has logarithmically spaced markings 36 for True Air Speed (TAS), i.e., indicated airspeed adjusted for altitude, and is movably retained within a groove 38 in the upper disk. The markings on the rule are parallel and adjacent to logarithmically spaced markings 40 on the upper disk for wind speed (WIND). The rule may slide in and out to adjust for particular ratios of wind speed to airspeed, but every point on the scale for airspeed should always have the same ratio to the adjacent point on the scale for wind speed. The circumference of the lower disk is marked off in degrees 42 representing compass points, with zero degrees and 360 degrees being the same point 44, magnetic north. (These markings are repeated 46 near the center of the lower disk, where they are adjacent to the innermost circle of markings 48 on the middle disk, which represent degrees of a circle on which zero or 360 degrees is directly ahead of the nose of the airplane, and 180 is directly behind the tail of the airplane, as may be emphasized by indicia which are omitted in the drawings to avoid cluttering the view.)

Figure 4:
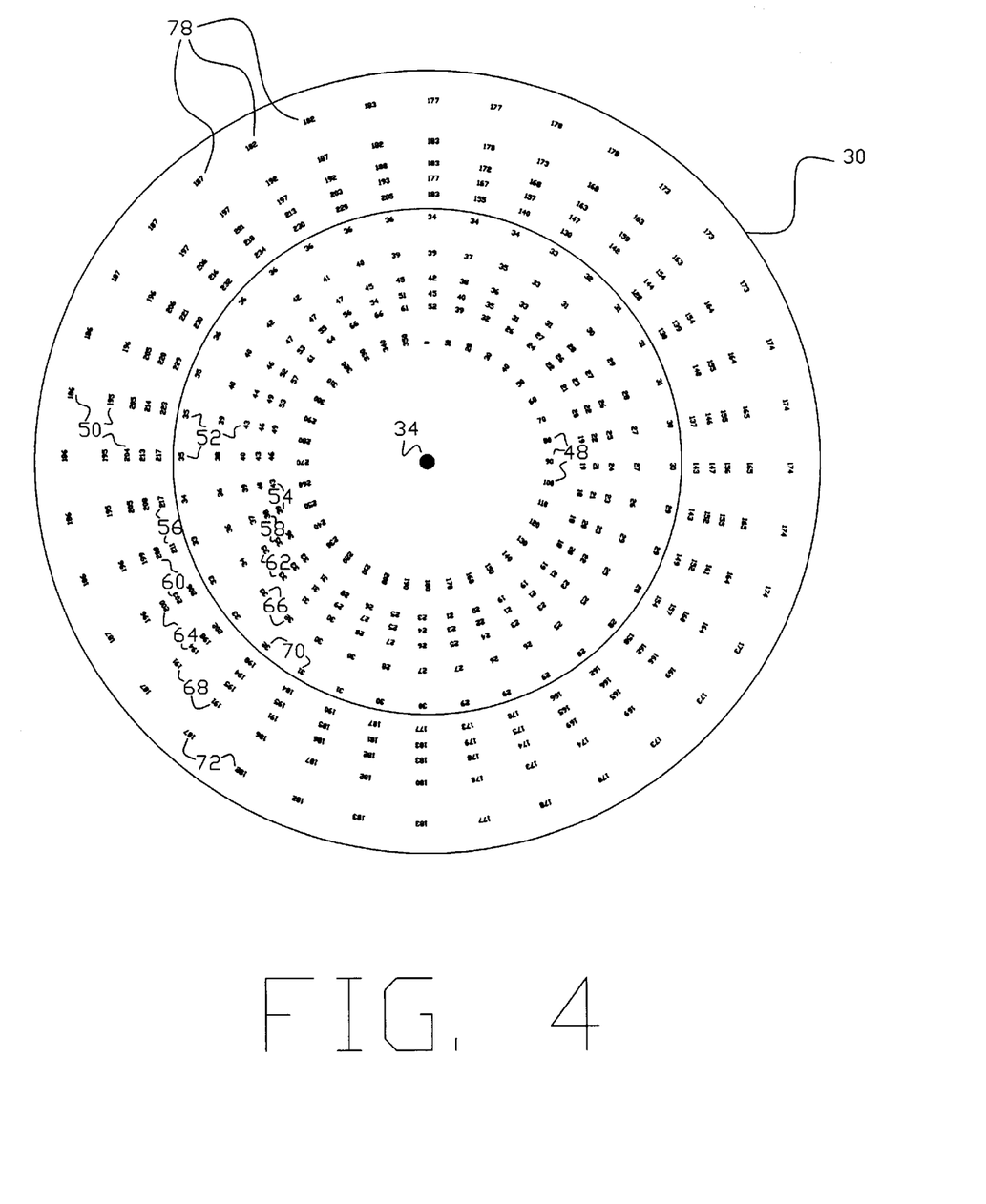
FIG. 4 is a top plan view of the middle disk in the first preferred embodiment of the invention.
Figure 5:
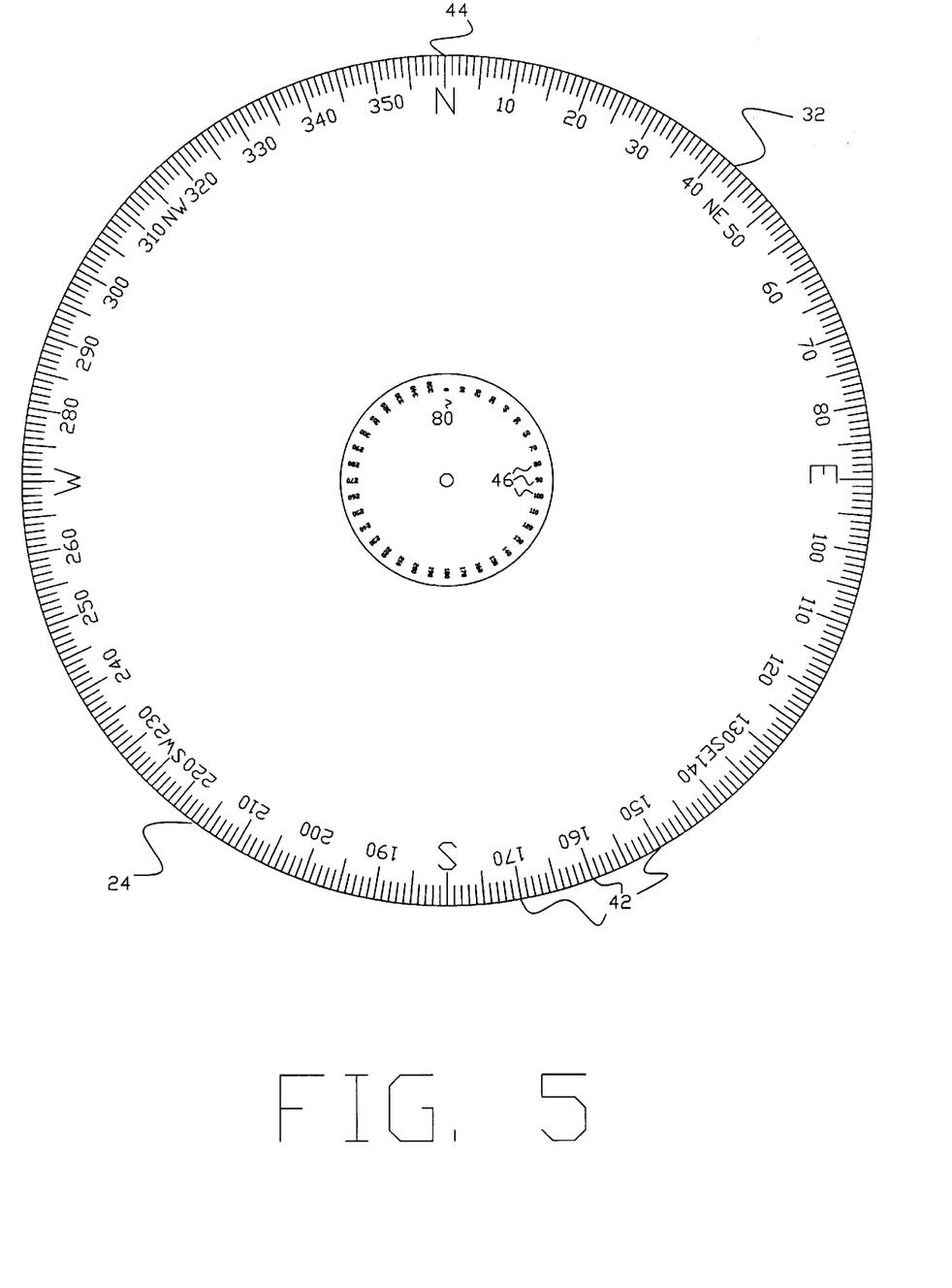
FIG. 5 is a top plan view of the lower disk in the first preferred embodiment of the invention.

The middle disk has outer markings 50 for heading corrections on the outbound leg, and inner markings 52 for station corrections. The inner and outer markings are each arranged in an equal number of concentric circles, with circle 54 corresponding to circle 56, circle 58 corresponding to circle 60, circle 62 corresponding to circle 64, circle 66 corresponding to circle 68, and circle 70 corresponding to circle 72. The difference between the radii of each corresponding circle of markings is equal to the distance between the arrows marked "STN" 74 (for station) and "HEAD" 76 (for heading) on the straight rule. Each pair of corresponding circles is for a certain ratio between true airspeed and wind speed. The markings on the middle disk are also arranged in columns 78 that radiate out from the center, which can be aligned with degree markings on the lower disk, and along which the straight rule can be aligned. Each column contains figures for a certain difference between ground bearing and wind bearing. All of these figures are derived from dimensional analysis of the solutions of the abovementioned simultaneous equations. Each heading correction is calculated by subtracting the ground bearing from the heading plus 180 degrees. Each station correction is calculated by subtracting 32.5 degrees from the heading plus 180 degrees. These calculations are done in modular arithmetic with modulus 360, and the results have been rounded off to the nearest integer.

In using the slide rule embodiment for a right turn, the user performs the following steps:

1. Align zero degrees 80 on the lower disk 32, with the inbound bearing to the station as indicated in degrees 48 on the middle disk 30. This alignment is maintained through the remaining steps.
2. Rotate the straight rule 26 so that its clockwise-facing edge 88 is aligned with the degree markings 42 and 46 on the lower disk to indicate the direction from which the wind is blowing (with zero degrees being magnetic north, as shown in FIG. 2).
3. Align the true airspeed, indicated by the markings 36 on the straight rule 26, with wind speed, indicated by the markings 40 on the upper disk 28. (In FIG. 2, a true air speed of 200 mile per hour is aligned with a wind speed of 10 miles per hour.) As a rule of thumb, true airspeed (t) can be determined from the indicated airspeed (i), given the altitude in feet (a), by the formula: $t=i[1+(a/50,000)]$. If the altitude is given in meters, then the formula is converted to: $t=i[1+(a/15,240)]$.
4. Note and record the station correction on the middle disk indicated by the STN arrow 74 on the straight rule, interpolating if necessary. (In FIG. 2, the station correction is 74, while the heading correction is a little bit more than 177. As the difference between 177 and the next closest marking of 183 is 6, and the arrow indicates a point about one-sixth of the way from 177 to 183, we may interpolate to get a heading correction of 178.)
5. Rotate the straight rule until its clockwise-facing edge 82 points to the degrees 42 and 46 indicated on the lower disk by the station correction. Read the bearing to the station at which the pilot should begin turning inbound at the end of the outbound leg of the holding pattern, from the degree markings 48 to which edge 82 points on the middle disk.
6. Rotate the straight rule again until its edge 82 points to the degrees 42 and 46 indicated on the lower disk by the air bearing correction. Read the heading on the outbound leg from the degree marking to which edge 82 points on the outer disk.

If there is no wind, the station correction is 32.5 degrees and the heading correction is 180 degrees. (This is not indicated on the slide rule.)

For a left turn, the user determines the heading for the outbound leg as in steps 1, 2, 3, 4 and 6 above, and the station bearing at which to turn inbound as follows:

1. Align zero degrees 80 on the lower disk 32, with the bearing the wind is blowing from as indicated in degrees 48 on the middle disk 30. This alignment is maintained until step 5.
2. Rotate the straight rule 26 so that its clockwise-facing edge 88 is aligned with the degree markings 42 and 46 on the lower disk to indicate the direction from which the wind is blowing.
3. Align the true airspeed, indicated by the markings 36 on the straight rule 26, with wind speed, indicated by the markings 40 on the upper disk 28.
4. Note and record the station correction on the middle disk indicated by the STN arrow 74 on the straight rule, interpolating if necessary.
5. Align the degree markings 42 and 46 for the station correction on the lower disk with the degree markings 48 for the inbound bearing to the station on the middle disk. Rotate the straight rule until its edge 82 is at zero 50 on the lower disk. Read the station bearing at which to turn inbound at the end of the outbound leg from the degree markings 48 for the middle disk indicated by edge 82.

Figure 6:
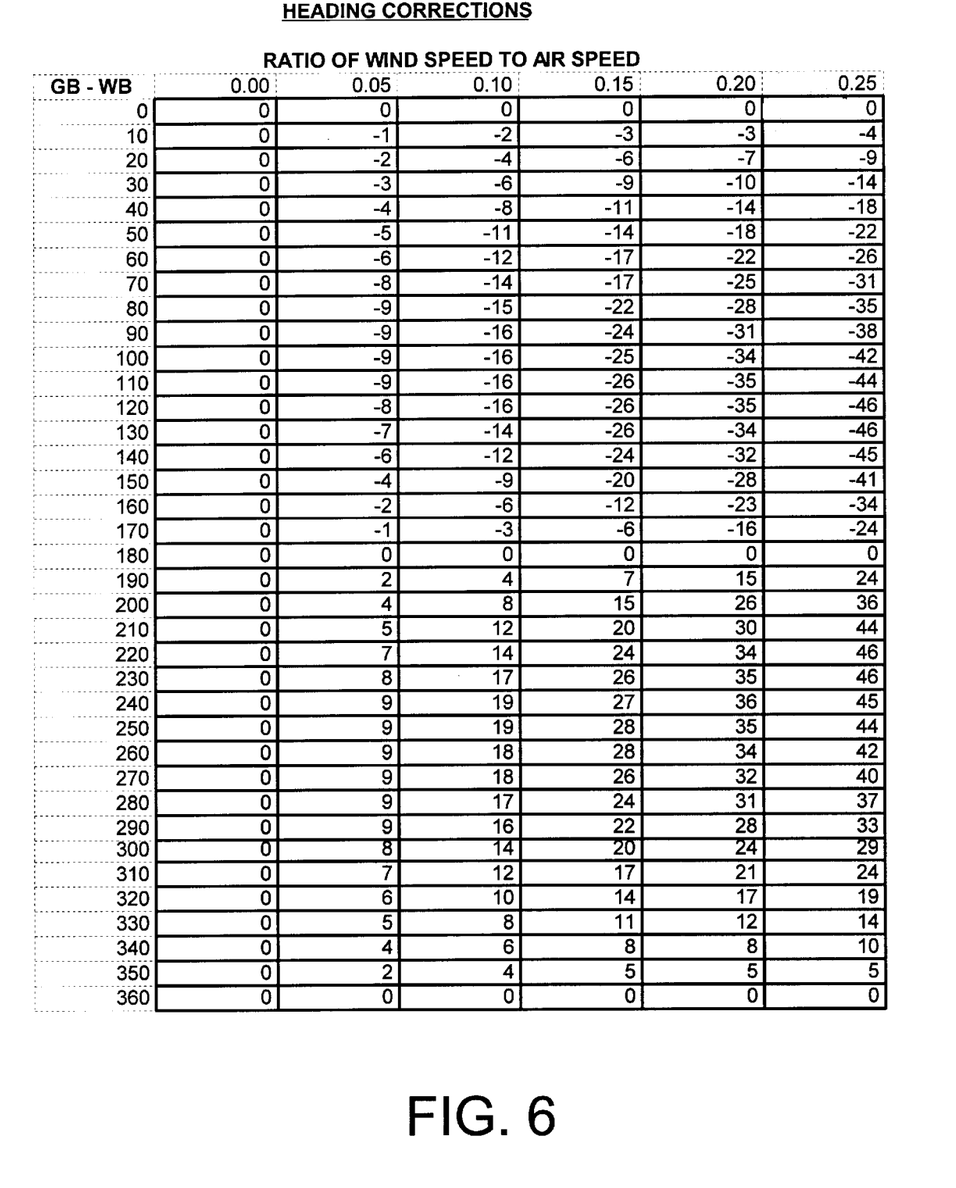
FIG. 6 is a table of heading corrections used in the second preferred embodiment of the invention.
Figure 7:
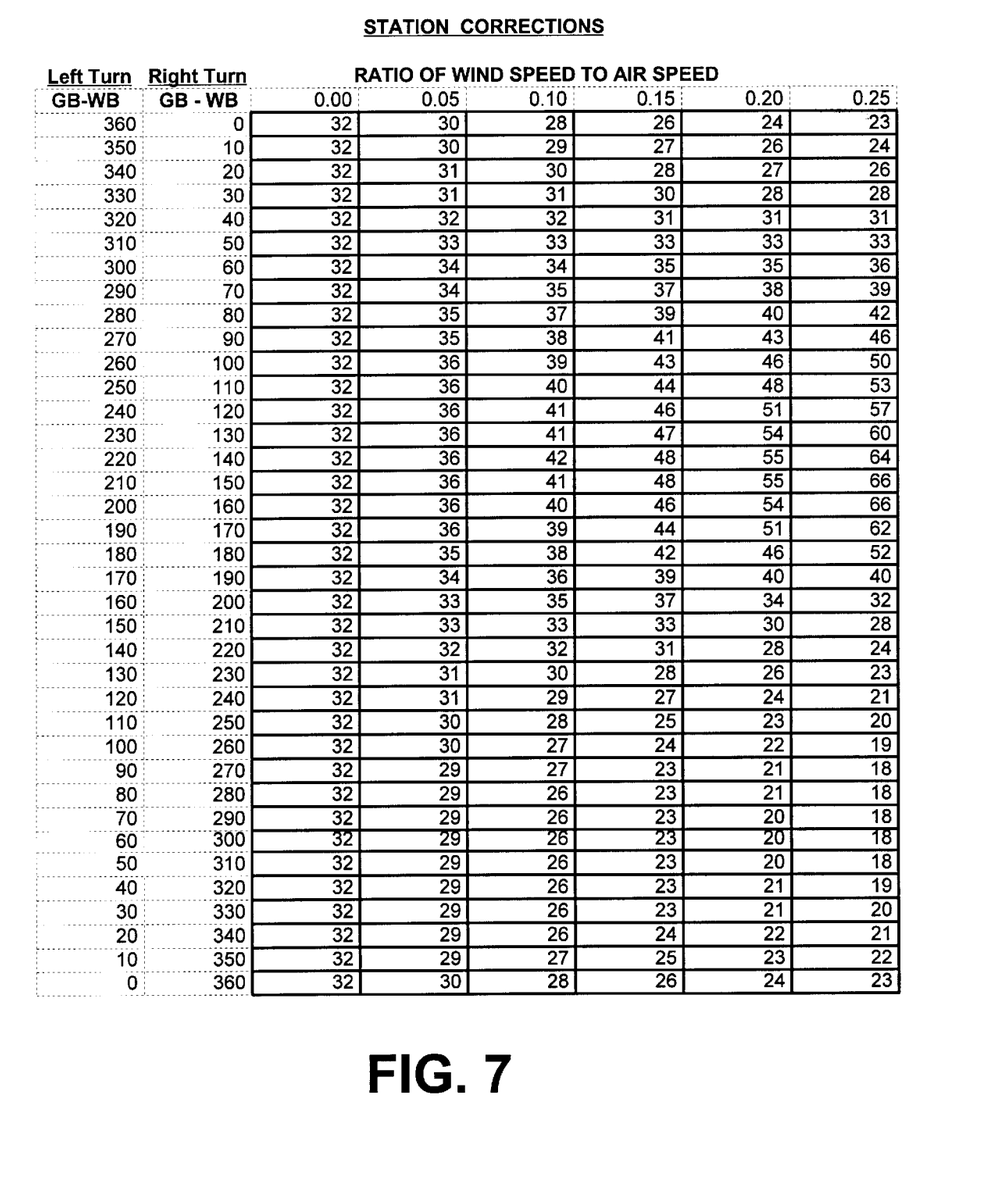
FIG. 7 is a table of station corrections used in the second preferred embodiment of the invention.
Figure 8:
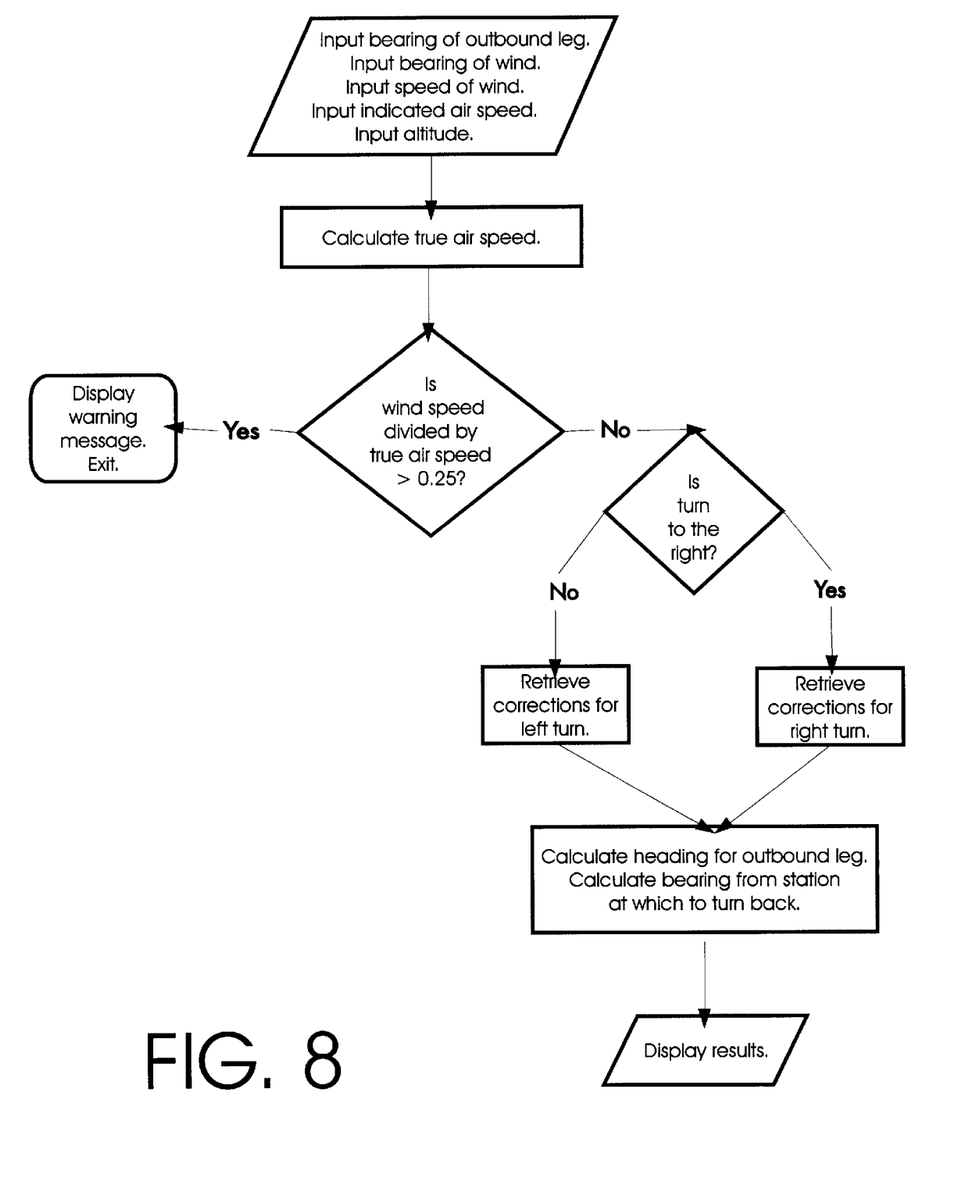
FIG. 8 is a flow chart of the process of solving a holding pattern using the second preferred embodiment of the invention.

For the second preferred embodiment of the invention, a digital computation device, the tables given in FIGS. 6 and 7 and a program using them to solve holding patterns may be either entered into erasable memory or permanently hardwired in a pocket calculator, computer or other electronic device. The flowchart in FIG. 8 illustrates the process of solving a holding pattern using the second embodiment. The user is first asked to input the bearing of the outbound leg of the holding pattern in degrees (which is given by radio communication from air traffic control, and refers to the degrees clockwise from magnetic north). The pilot is then prompted to input wind bearing, wind speed, indicated airspeed, and altitude. True airspeed is derived from indicated airspeed, by dividing altitude in feet by 50,000, adding one, and multiplying by the indicated airspeed. (Alternatively, altitude in meters can be divided by 15,240.) If the ratio of the wind speed divided by the airspeed is greater than 25%, the invention will display a message that said ratio is too great for a solution to be given, and stop. If the wind speed to airspeed ratio is less than or equal to 25%, the pilot is then asked whether he will be turning to the left or to the right. The device then calculates and displays the bearing toward which the pilot should align his airplane (heading) on the outbound leg to compensate for the wind, the bearing to the station at which he should begin turning inbound at the end of the outbound leg of the holding pattern, and reminds him whether the turn is to be to the left or to the right.

FIG. 6 gives heading corrections, with rows for differences between ground bearings and wind bearings (GB-WB), and columns for ratios of wind speed to airspeed. Each heading correction is calculated by subtracting the ground bearing from the heading (in modular arithmetic with modulus 360). The heading corrections indicate how many degrees to the right of the correct ground bearing on the outbound leg the pilot must align the airplane to adjust for the wind. (If the number is negative, the plane must be aligned to the left of the correct ground bearing.) The device adds the heading correction to the bearing for the outbound leg entered by the user, to give the heading for the outbound leg. Note that this table corresponds to the outer part of the middle disk in the first embodiment, with the rows in the table equivalent to the radial columns on the disk, and the columns in the table equivalent to the circular rows on the disk (with 180 degrees added to every figure in the table to avoid the need for negative numbers on the slide rule).

FIG. 7 gives station corrections, with rows for differences between ground bearings and wind bearings (note that the values are reversed for left and right turns), and columns for ratios of wind speed to airspeed. (The differences for the left turns may be derived by subtracting the differences for the right turns from 360 degrees. The table may be stored in memory separately for left turns and right turns.) Each station correction is calculated by subtracting 32.5 degrees from the heading plus 180 degrees for a right hand turn, or by adding 32.5 degrees to the heading plus 180 degrees for a left hand turn (in modular arithmetic with modulus 360). The station corrections indicate at how many degrees difference from the correct ground bearing on the inbound leg the pilot should begin to turn the plane at the end of the outbound leg. For a left-hand turn, the device adds the station correction to the heading plus 180 degrees, to give the bearing to the station at which the pilot should begin turning left at the end of the outbound leg. For a right-hand turn, the device subtracts the station correction from the heading plus 180 degrees, to give the bearing to the station at which the pilot should begin turning right at the end of the outbound leg. Note that this table corresponds to the inner part of the middle disk in the first embodiment, with the rows in the table equivalent to the radial columns on the disk, and the columns in the table equivalent to the circular rows on the disk. (The values given in the tables in FIGS. 6 and 7 have been rounded off to the nearest integer.) Unless, as entered by the user, the difference between ground bearing and wind bearing, and the ratio between wind speed and airspeed, precisely matches values given in the tables, the invention will interpolate between the closest values given in the tables.

It is to be understood that the present invention is not limited to the preferred embodiments described above, but encompasses any and all embodiments within the scope of the following claims.

We claim:

1. A device comprising:
    means for determining a bearing to a station at which a turn in a holding pattern of an airplane should be executed, without requiring a user to keep track of time; and
    means for determining a heading of the airplane in a leg of the holding pattern, necessary to meet requirements of the holding pattern.

2. The device according to claim 1, wherein the means for determining the bearing to the station and the means for determining the heading include adjustments for wind speed, wind bearing, indicated speed of the airplane adjusted for altitude, and required bearing of the airplane in a portion of a flight path.

3. The device according to claim 2, wherein the means for determining the bearing from the station and the means for determining the heading include mathematical analysis of possible flight paths, wherein variables comprise the wind speed, the wind bearing, the indicated speed of the airplane adjusted for the altitude, the bearing of the airplane, the heading of the airplane, and actual speed of the airplane.

4. The device according to claim 3, wherein the mathematical analysis includes solving simultaneous equations with said variables.

5. The device according to claim 4, wherein the simultaneous equations are:

$$t[\cos(h)]+ws[\cos(wb)]=gs[\cos(gb)]$$

and $$t[\sin(h)]+ws[\sin(wb)]=gs[\sin(gb)]$$

where "t" is the indicated speed of the airplane adjusted for the altitude, "h" is the heading of the airplane, "ws" is the wind speed, "wb" is the wind bearing, "gs" is the actual speed of the airplane, and "gb" is the bearing of the airplane.

6. The device according to claim 5, wherein the simultaneous equations are solved over ranges of possible values for said variables, and solutions of the simultaneous equations are tabulated and subjected to dimensional analysis.

7. The device according to claim 6, wherein two-dimensional arrays of numbers are generated from the solutions of the simultaneous equations, by a process that includes:
    dividing the wind speed by the indicated speed of the airplane adjusted for altitude to form a range of ratios in a first dimension; and
    subtracting the bearing of the wind from the bearing of the airplane, using modular arithmetic, to form a range of differences in a second dimension.

8. The device according to claim 7, wherein a first two-dimensional array of numbers is generated by a process that includes:
    for each intersection of a ratio and a difference, calculating a heading correction, by subtracting the bearing of the airplane from the heading of the airplane, using modular arithmetic.

9. The device according to claim 8, wherein a second two-dimensional array of numbers is generated by a process that includes:
    for each intersection of a ratio and a difference, calculating a station correction, by subtracting a constant from the heading of the airplane, using modular arithmetic.

10. The device according to claim 9, wherein the device is an analog computation device.

11. The device according to claim 10, wherein the analog computation device is a slide rule.

12. The device according to claim 11, wherein the slide rule has a circular portion with indicia for the heading corrections and the station corrections, and a linearly aligned portion with a first member having a logarithmic scale for wind speed, and a second member having a logarithmic scale for airspeed.

13. The device according to claim 12, wherein the circular portion comprises two disks rotatably retained on a common axis with the first member of the linearly aligned portion, with each disk having indicia for bearing about a complete circle, the second disk having the indicia for the heading corrections and the station corrections, and the second member of the linearly aligned portion being movably retained on the first member of the linear portion, so that the logarithmic scales can be adjusted for varying ratios of wind speed to airspeed.

14. The device according to claim 13, wherein:
    indicia for the heading corrections are on a first section of the second disk, and the indicia for the station corrections are on a second section of the second disk;

the indicia for each section are arranged in concentric circles corresponding to differing ratios of wind speed to airspeed, and in radial columns corresponding to varying differences between the bearing of the wind and the bearing of the airplane;

the second member of the linear portion has a first pointer that points at or between the indicia for the heading corrections, and a second pointer that points at or between the indicia for the station corrections; and said concentric circles are logarithmically spaced to allow for interpolation for intermediate ratios of wind speed to airspeed, and said radial columns are evenly spaced to allow for interpolation for intermediate differences between the bearing of the wind and the bearing of the airplane.

15. The device according to claim 9, wherein the device is an electronic digital computation device.

16. The device according to claim 15, wherein the first two-dimensional array is stored in memory, and the device is programmed to:

prompt a user to enter the required bearing of the airplane;

prompt the user to enter the bearing of the wind;

prompt the user to enter the speed of the wind;

prompt the user to enter the indicated speed of the airplane;

prompt the user to enter the altitude;

adjust the indicated speed for the altitude to give true airspeed;

compare the ratio of wind speed to true airspeed, and if it exceeds a maximum value, warn the user and stop;

prompt the user to indicate whether there will be a left turn or a right turn;

subtract the bearing of the wind from the required bearing of the airplane; and look up the heading correction in the first array, for the ratio of wind speed to true airspeed and the difference between the bearing of the wind and the bearing of the airplane, interpolating if necessary, and add the heading correction to the bearing of the airplane to give the heading of the airplane, using modular arithmetic.

17. The device according to claim 16, wherein the second two-dimensional array is stored in memory in a first form for left turns, and in a second form for right turns, and the device is programmed to:

if a left turn is indicated, look up the station correction in the first form of the second array, for the ratio of wind speed to true airspeed and the difference between the bearing of the wind and the bearing of the airplane, interpolating if necessary, and add the heading correction to the required bearing of the airplane plus the bearing for one-half of a full circle, to give the bearing to the station at which the airplane should begin turning left, using modular arithmetic;

if a right turn is indicated, look up the station correction in the second form of the second array, for the ratio of wind speed to true airspeed and the difference between the bearing of the wind and the bearing of the airplane, interpolating if necessary, and subtract the heading correction from the required bearing of the airplane plus the bearing for one-half of a full circle, to give the bearing to the station at which the airplane should begin turning right, using modular arithmetic.

18. A method for determining a heading and a bearing to a station at which a turn in a holding pattern of an aircraft should be executed, without requiring a user to keep track of time, comprising the steps of:

solving simultaneous equations for possible flight paths;

tabulating solutions of the simultaneous equations over ranges of possible values for relevant variables;

generating arrays of numbers from the tabulated solutions;

marking indicia representing the arrays of numbers on an analog calculating device;

determination by a user of relevant independent variables;

determination of relevant dependent variables using the analog calculating device; and use of the analog calculating device to determine a heading and a bearing to a station at which a turn in a holding pattern should be executed.

19. A method for determining a heading and a bearing to a station at which a turn in a holding pattern of an aircraft should be executed, without requiring a user to keep track of time, comprising the steps of:

solving simultaneous equations for possible flight paths;

tabulating solutions of the simultaneous equations over ranges of possible values for relevant variables;

generating arrays of numbers from the tabulated solutions;

storing the arrays of numbers in a digital calculating device;

input by a user of relevant independent variables;

determination of relevant dependent variables by the digital calculating device; and output by the digital calculating device of a heading and a bearing to a station at which a turn in a holding pattern should be executed.

* * * * *

UNITED STATES PATENT AND TRADEMARK OFFICE
CERTIFICATE OF CORRECTION

| | |
|---|---|
| PATENT NO. | : 6,167,627 B1 |
| APPLICATION NO. | : 09/076689 |
| DATED | : January 2, 2001 |
| INVENTOR(S) | : Bruce Gary Wilder and Otto Charles Wilke |

It is certified that error appears in the above-identified patent and that said Letters Patent is hereby corrected as shown below:

FIG. 8, in the second line of the next to the last box in the flow chart, "from" should read --to the--.

Column 4, line 21, "NBD" should read --NDB--.

Column 4, line 44, "NBD" should read --NDB--.

Column 4, line 46, "NBD" should read --NDB--.

Column 4, line 57, the first and second occurrences of "NBD" should both read --NDB--, and "VOR/NBD" should read --VOR/NDB--.

Column 7, line 17, "ground bearing from the heading" should read --outbound heading from the inbound leg ground bearing--.

Column 7, line 19, "is calculated by subtracting 32.5 degrees from the heading plus 180 degrees." should read --for a left hand turn is calculated by subtracting the inbound leg ground bearing from the bearing back to the VOR/NDB measured from the end of the outbound leg. Each station correction for a right hand turn is calculated by subtracting the bearing back to the VOR/NDB measured from the end of the outbound leg from the inbound leg ground bearing.--.

Column 9, lines 14-18, delete: "Each station correction is calculated by subtracting 32.5 degrees from the heading plus 180 degrees for a right hand turn, or by adding 32.5 degrees to the heading plus 180 degrees for a left hand turn (in modular arithmetic with modulus 360)."

Claim 17, column 11, line 51, "heading" should read --station--.

Claim 17, column 12, line 1, insert --outbound-- between "required" and "bearing".

Claim 17, column 12, line 9, "heading" should read --station--.

Signed and Sealed this
Twenty-eighth Day of February, 2012

David J. Kappos
*Director of the United States Patent and Trademark Office*

CERTIFICATE OF CORRECTION (continued)
U.S. Pat. No. 6,167,627 B1

Claim 17, column 12, line 10, insert --outbound-- between "required" and "bearing".

Claim 19, column 12, line 37, between "paths" and the ";", insert --over ranges of possible values for relevant variables--.

Claim 19, column 12, line 38, "tabulating solutions of the simultaneous equations" should read --determining heading and station corrections for the possible flight paths--.

Claim 19, column 12, lines 40-41, "from the tabulated solutions" should read --with the heading and station corrections--.

Claim 19, column 12, line 46, "dependent variables" should read --heading and station corrections--.